United States Patent Office
3,632,572
Patented Jan. 4, 1972

3,632,572
11-AMINO-6-MORPHANTHRIDONES
Gordon Northrop Walker, Morristown, N.J., assignor to Ciba Corporation, New York, N.Y.
No Drawing. Continuation-in-part of application Ser. No. 622,407, Mar. 13, 1967, now Patent No. 3,504,088, which is a continuation-in-part of application Ser. No. 598,979, Dec. 5, 1966. This application Sept. 18, 1967, Ser. No. 668,704
Int. Cl. C07d 41/00
U.S. Cl. 260—239.3 T
24 Claims

ABSTRACT OF THE DISCLOSURE 11-amino-5,6-dihydro-6-morphanthridones, e.g. those of the formula

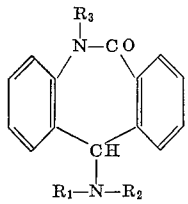

$R_1$=H, alkyl, alkenyl or free, esterified or etherified hydroxyalkyl
$R_2$=aza-, oxa- or thia-alkyl, -aralkyl or -cycloalkyl-alkyl
$R_1+R_2$=aza-, oxa- or thia-alkylene or -aralkylene
$R_3$=H or alkyl acyl derivatives, iminoethers, salts and quaternaries thereof, inhibit gastric secretion.

CROSS-REFERENCES TO RELATED APPLICATIONS

This is a continuation-in-part of application Ser. No. 622,407, filed Mar. 13, 1967 (now Pat. No. 3,504,088), which in turn is a continuation-in-part of application Ser. No. 598,979, filed Dec. 5, 1966 (now abandoned).

SUMMARY OF THE INVENTION

The present invention concerns and has for its object the provision of new 11-amino-5,6-dihydro-6-morphanthridones, more particularly those of Formula I

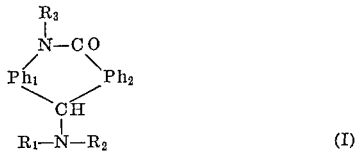

in which each of $Ph_1$ and $Ph_2$ stands for a 1,2-phenylene radical, $R_1$ for hydrogen, lower alkyl, alkenyl or free, esterified or etherified hydroxyalkyl, $R_2$ for lower mono-aza-, oxa- or thia-alkyl, -aralkyl or -cycloalkyl-alkyl or $R_1$ and $R_2$, when taken together, for lower mono-aza, oxa- or thia-alkylene or -aralkylene, in which $R_1$, $R_2$ moieties the heteroatoms are separated by at least 2 carbon atoms, and $R_3$ for hydrogen or lower alkyl, acyl derivatives, iminoethers, salts and quaternaries thereof, as well as of corresponding pharmaceutical compositions and methods for the preparation of these products. Said compositions are primarily useful in the management and treatment of gastric irritation or gastric ulcers by reducing the amount of free acid in the stomach.

DESCRIPTION OF THE PREFERRED EMBODIMENTS

The 1,2-phenylene radicals $Ph_1$ and $Ph_2$ are unsubstituted or substituted by one or more than one of the same or of different substituents, for example, lower alkyl, such as methyl, ethyl, n- or i-propyl or -butyl, free or functionally converted hydroxy or mercapto groups, such as lower alkoxy or alkylmercapto, e.g. methoxy, ethoxy, n- or i-propoxy or -butoxy, methyl- or ethylmercapto, halogen, e.g. fluoro, chloro or bromo, trifluoromethyl, nitro or amino, especially di-lower alkylamino, e.g. dimethylamino or diethylamine. The term "lower," referred to above and hereinafter in connection with hydrocarbon radicals, defines such with up to 7, preferably up to 4, carbon atoms. Preferred radicals $Ph_1$ and $Ph_2$ are 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene and (di-lower alkylamino)-1,2-phenylene.

A lower alkyl radical $R_1$ and/or $R_3$ is, for example, such mentioned above, but also n- or i-pentyl, n-hexyl or n-heptyl. A lower alkenyl group $R_1$ is, for example, allyl, methallyl or 2-butenyl. A lower hydroxyalkyl radical $R_1$ is any of the above-mentioned alkyl radicals containing in any position of the chain, which is separated from the adjacent nitrogen atom by at least 2 carbon atoms, one hydroxy group. The latter may be esterified, e.g. by a mineral or carboxylic acid, such as a hydrohalic or lower alkanoic acid, e.g. hydrochloric, hydrobromic, acetic, propionic, butyric or pivalic acid, or etherified, e.g. by an alcohol or phenol, such as a lower alkanol, in which instance said radicals $R_1$, $R_2$ become oxaalkyl, e.g. that described below.

An aza-, oxa- or thia-alkyl, -aralkyl or -cycloalkyl-alkyl radical $R_2$ is, for example, mono- or di-lower alkylamino-, phenyl-lower alkylamino- or alkyleneimino-lower alkyl, e.g. ω-methylamino-, ethylamino-, i-propylamino-, dimethylamino-, diethylamino-, di-n-propylamino-, di-n-butylamino-, benzylamino-, 1- or 2-phenethylamino-, ethyleneimino-, pyrrolidino-, piperidino- or 1,7-heptyleneimino-ethyl, -propyl, -butyl or -pentyl; lower alkoxy-, phenyl-lower alkoxy-, lower alkylmercapto- or phenyl-lower alkylmercapto-lower alkyl, e.g. ω-methoxy-, ethoxy-, n-propoxy-, benzyloxy-, methylmercapto-, ethylmercapto- or benzylmercapto-ethyl, -propyl or -butyl; tetrahydro-2-furyl-methyl or tetrahydro-2-pyranylmethyl.

$R_1$ and $R_2$, when taken together, preferably represent mono-aza-, oxa- or thia-lower alkylene, N-lower alkyl-, free, esterified or etherified N-(hydroxy-lower alkyl)-, e.g. N-(halogeno-lower alkyl)-, N-(lower alkanoyloxy-lower alkyl)-, N-(lower-alkoxy-lower alkyl)- or N-(lower alkoxy-lower alkoxy-lower alkyl)-, N-(tert. amino-lower alkyl)-, e.g. N-(mono-aza-, oxa- or thia-lower alkyleneimino-lower alkyl), or N-(N-lower alkyl- or free, esterified or etherified hydroxy-lower alkyl-mono-azaalkyleneimino-lower alkyl)-, N-(phenyl-lower alkyl)-, N-lower alkoxycarbonyl- or N-phenyl-mono-aza-lower alkylene, such as 3-aza-, 3-oxa- or 3-thia-pentylene-(1,5), 3-methyl-, 3-ethyl-, 3-propyl-, 3-(2-hydroxyethyl)-, 3-(3-hydroxypropyl)-, 3-(2-chloroethyl)-, 3-(2-acetoxyethyl)-, 3-(2-methoxyethyl)-, 3-(3-pivalyloxypropyl)-, 3-(4-methoxybutyl)-, 3-[2(4-methylpiperazino)-ethyl]-, 3-{2-[4-(2-hydroxyethyl)-piperazino]-ethyl}-, 3-(2-morpholino-ethyl)-, 3-benzyl-, 3-(1- or 2-phenethyl), 3-ethoxycarbonyl- or 3-phenyl-3-aza-pentylene-(1,5), 3-aza-hexylene-(1,5) or -(1,6), 3-methyl-, 3-ethyl- or 3-benzyl-3-aza-hexylene-(1,5) or -(1,6) or 4-aza- or oxa-heptylene-(2,6). The aromatic moieties present in the above radicals $R_1$ and/or $R_2$, i.e. the phenyl groups, may be unsubstituted or substituted as shown for $Ph_1$ and $Ph_2$.

Acyl derivatives are preferably those of the secondary amines but may also be those containing the acyl group attached to the nitrogen atom in 5-position. The acyl group therein stands preferably for lower alkanoyl, such as acetyl, propionyl, butyryl or pivalyl, but also for lower alkenoyl, such as acryloyl or methacryloyl, monocyclic carbocyclic aroyl or aryl-lower alkanoyl or alkenoyl, such as benzoyl, phenylacetyl or cinnamoyl. These acyl radicals may be unsubstituted or substituted, especially in the aromatic portion, as shown for $Ph_1$ and $Ph_2$. The iminoethers of the invention are preferably the lower alkyl or aralkyl iminoethers in which the lower alkyl or aralkyl, e.g. phenyl-alkyl radical, for example, is such mentioned above. Said iminoethers are more particularly defined as 6-lower alkoxy- or aralkoxy-11-amino-morphanthridines.

The compounds of the invention exhibit valuable pharmacological properties. Apart from antispasmodic and antiinflammatory effects, they primarily cause a decrease in the gastric secretion, especially of gastric hydrochloric acid, as can be demonstrated in animal tests using, for example mammals, e.g. rats or dogs as test objects. In the latter, gastric secretion may be induced either by food or parenteral application of histamine. Besides the above-mentioned utility, the compounds of this invention are also useful as research tools in the study of the releasing mechanism of gastric secretion or as intermediates in the manufacture of other valuable, particularly pharmacologically active compounds.

Particularly useful are compounds of Formula I, in which each of $Ph_1$ and $Ph_2$ is 1,2-phenylene, (lower alkyl)-1,2-phenylene, (lower alkoxy)-1,2-phenylene or (halogeno)-1,2-phenylene, $R_1$ is hydrogen, lower alkyl or lower alkanoyl, $R_2$ is di-lower alkylamino-lower alkyl, lower alkyleneimino-lower alkyl, lower alkoxy-lower alkyl, lower alkylmercapto-lower alkyl or $R_1$ and $R_2$, when taken together, are mono-aza-, oxa- or thia-lower alkylene, N-lower alkyl- or N-(hydroxy- or lower alkanoyloxy-lower alkyl)-mono-aza-lower alkylene, wherein the heteroatoms are separated by at least 2 carbon atoms and $R_3$ is hydrogen, as well as said compounds in which $R_3$ is lower alkyl or lower alkanoyl, lower alkyl iminoethers, acid addition salts and lower alkyl quaternaries thereof, as well as those compounds of Formula I, in which each of $Ph_1$ and $Ph_2$ is 1,2-phenylene, (lower alkyl)-1,2-phenylene, (lower alkoxy)-1,2-phenylene or (halogeno)-1,2-phenylene and $R_1$ and $R_2$, when taken together, are N-(halogeno-lower alkyl)-, (lower alkoxy-lower alkyl)-, N-(lower alkoxy-lower alkoxy-lower alkyl)-, N - lower alkoxycarbonyl-, N-(phenyl-lower alkyl)-, N-phenyl- or N-(N-hydroxy-, halogeno-, lower alkanoyloxy- or lower alkoxy-lower alkyl-monoaza-lower alkyleneimino - lower alkyl)-monoaza - lower alkylene, wherein the heteroatoms are separated by at least 2 carbon atoms, and $R_3$ is hydrogen, lower alkyl or lower alkanoyl, lower alkyl iminoethers, acid addition salts and lower alkyl quaternaries thereof.

Especially valuable are the compounds of Formula II

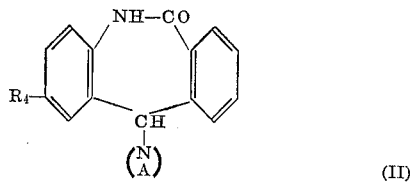

(II)

in which A is 3-methyl-, 3-ethyl-, 3-(2-hydroxyethyl)- or 3-(2-methoxyethyl)-3-aza-pentylene(1,5) or 3-oxa-pentylene(1,5), and $R_4$ is chloro and therapeutically useful acid addition salts thereof, as well as those compounds of Formula II, in which A has the meaning given and $R_4$ is hydrogen and therapeutically useful acid addition salts thereof, which when applied to rats at oral doses between about 10 and 50 mg./kg./day, show good antiinflammatory effects or, when applied to dogs with a Pavlov or Heidenhain pouch at oral doses between about 0.1 and 5 mg./kg./day, cause excellent inhibition of, preferably the food induced, gastric secretion.

The compounds of the invention are prepared according to methods in themselves known. Advantageously they are obtained by (a) Reacting a reactive ester of an 11-hydroxy-5,6-dihydro-6-morphanthridone, more particularly a compound of the formula

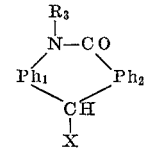

in which X stands for a halogen atom, an aliphatic or aromatic sulfonyloxy group or the azido group, with a primary or secondary amine, more particularly that of the formula $R_1$—NH—$R_2$, or (b) Reacting an 11-amino-5,6-dihydro-6-morphanthridone, more particularly a compound of the formula

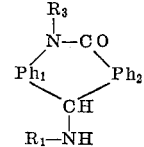

with a reactive ester of an alcohol, more particularly such of the formula $R_2$—X, or (c) Hydrolyzing or alcoholysing a reactive functional derivative of an 11-amino-6-hydroxy-morphanthridine, more particularly a compound of the formula

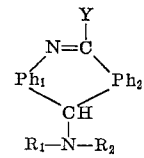

in which Y stands for a halogen atom, an aliphatic or aromatic sulfonyloxy, prim., sec. or tert. amina or hydrazino group and, if desired, converting any resulting compound into another disclosed compound.

In the starting material used in reaction (a), X preferably represents halogen, e.g. chloro, bromo or iodo, but may also stand for sulfonyloxy, e.g. methane-, ethane- or benzene-sulfonyloxy, tosyloxy or brosyloxy. In the starting material used in reaction (c), Y preferably represents a halogen atom or a tert. amino group, such as that mentioned for

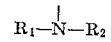

di-lower alkylamino or lower alkyleneimino.

The above process is carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

In the above process, e.g. reaction (a), the amine reagent is advantageously used in excess, in order to neutralize the generated acid and to serve as solvent. It may, however, also be used in equivalent amounts, advantageously in reaction (b), and in the presence of other condensing agents such as inorganic or organic bases, e.g. alkali metal carbonates or bicarbonates or tertiary nitrogen bases, for example, tri-lower alkylamines, N,N-dimethylaniline or pyridine. Hydrolysis according to reaction (c) is carried out in the usual manner, for example, with the use of aqueous acids or bases and alcoholysis advantageously with the use of alcoholates, e.g. alkali metal lower alkanolates or aralkanolates, in order to obtain the iminoethers.

Thre compounds of the invention so-obtained may be converted into each other according to known methods.

For example, resulting compounds of Formula I, in which $R_1$ and/or $R_3$ stand for hydrogen, may be reacted with a reactive ester of a corresponding alcohol, for example, such mentioned above, or may be acylated, for example, with a reactive functional derivative of a corresponding acid, such as a halide or anhydride thereof, or resulting acyl derivatives may be hydrolyzed, for example, with the use of acidic or alkaline hydrolyzing agents. Resulting esters may be hydrolyzed, transesterified or reacted with amines or alcoholates and resulting alcohols esterified. Resulting tertiary amines may be quaternized in the usual manner, for example with the use of reactive esters of alcohols, preferably of lower alkanols, but also of aralkanols, or resulting quaternaries converted into tertiary amines, for example form benzyl-quaternaries, the benzyl residue can be split off by hydrogenation. Resulting 11 - amino - 5,6-dihydro-6-morphanthridones may also be converted into the corresponding iminoesters, e.g. 6-halo-11-amino-morphanthridines, for example with the use of phosphorus halides and/or oxyhalides, e.g. phosphorus pentachloride or oxychloride, and then reacted with alkali metal alcoholates, in order to obtain the iminoethers of the invention.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts, which easily are obtained by reaction with alkali metals or their hydrides. Mainly, those starting materials should be used in the process of the invention that lead to the formation of those compounds indicated above as being specially valuable.

The starting material used is known or, if new, may be prepared according to known methods. For example, that used in reaction (a) can be obtained by reducing corresponding 5,6 - dihydromorphanthridine - 6,11-diones with sodium borohydride and esterifying the resulting 11-hydroxy compound in the usual manner, e.g. with the use of thionyl or sulfonyl halides. Resulting 11-halides may then be reacted with sodium azide, ammonia or amines in order to yield the relatively stable 11-azides or the compounds used in reaction (b) respectively. Under more drastic conditions the 11-hydroxy or amino-5,6-dihydro-6-morphanthridones are esterified in 6- or 6- and 11-position, for example with the use of phosphorous pentahalides or oxyhalides and/or sulfonyl halides. Resulting esters of 11 - amino - 6-hydroxy- or 6,11-dihydroxy-morphanthridines may then be reacted with amines or hydrazines and resulting esters of 11-hydroxy compounds reacted analogously as in step (a), in order to yield the compounds used in reaction (c).

The compounds of the invention can be used, for example, for the manufacture of pharmaceutical compositions containing them in conjunction or admixture with inorganic or organic, solid or liquid pharmaceutical excipients, suitable for enteral or parenteral or (as anti-inflammants) also topical administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

The mixture of 10.0 g. of 2,11-dichloro-5,6-dihydro-6-morphanthridone and 50 ml. 1-methyl-piperazine is heated on the steam cone for 2 hours, during which time it becomes homogeneous. It is evaporated on the steam cone, the residue triturated with water, the mixture filtered, the residue washed with water, dried, and recrystallized from methanol to yield the 2-chloro-11-(4-methyl-piperazino)-5,6-dihydro-6-morphanthridone of the formula

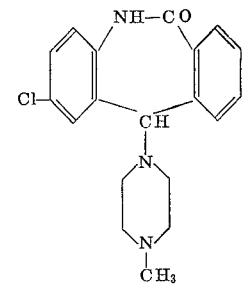

melting at 218–220° and remelting after cooling at 230–232°

The starting material is prepared as follows: The mixture of 67.0 g. 5,6-dihydro-morphanthridin-6,11-dione, 45.0 g. N-chloro-succinimide and 1.2 liter glacial acetic acid is refluxed for 5 hours. Upon cooling, crystals separate which are filtered off, washed with diethyl ether and recrystallized from dimethylformamide to yield the 2-chloro-5,6-dihydro-morphanthridin-6,11-dione melting at 310°.

20.0 g. thereof are dissolved in 800 ml. methanol and 10.0 g. sodium borohydride are added in portions during about 10 minutes. The mixture is concentrated at the steam cone to about 100 ml. and then cooled. The precipitate formed is filtered off, washed with water, dried and recrystallized from methanol to yield the 2-chloro-11-hydroxy-5,6-dihydro-6-morphanthridone melting at 273–274°.

The mixture of 60.0 g. thereof and 500 ml. thionyl chloride is heated at the steam cone until it becomes homogeneous. It is then evaporated, the residue dissolved in ethyl acetate, the solution filtered and concentrated. Upon cooling, crystals separate which are filtered off and recrystallized from ethyl acetate to yield the 2,11-dichloro-5,6-dihydro-6-morphanthridone melting at 254–257° with decomposition.

EXAMPLE 2

To the solution of 1.0 g. 2-chloro-11-(4-methylpiperazino) - 5,6 - dihydro-6-morphanthridone in the minimal amount of ethanol, 10 ml. of a saturated solution of methyl iodide in ethanol is added and the mixture refluxed for 2 hours. After cooling, the precipitate formed is filtered off, and recrystallized from ethanol to yield the 2-chloro-11-(4-methyl-piperazino) - 5,6 - dihydro-6-morphanthridone methiodide of the formula

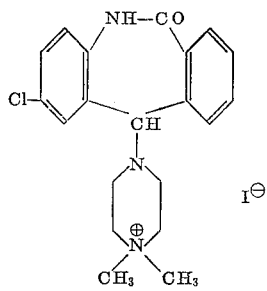

melting at 279–281° with decomposition.

In the analogous manner the corresponding ethiodide is prepared, melting at 278° with decomposition.

EXAMPLE 3

The mixture of 6.0 g. 5,11-dichloro-5,6-dihydro-6-morphanthridone and 50 ml. morpholine is heated at the steam cone for 2 hours. It is evaporated in vacuo, the residue triturated with water, the mixture filtered, the residue washed with water, dried and recrystallized from ethanol to yield the 2-chloro-11-morpholino-5,6-dihydro-6-morphanthridone of the formula

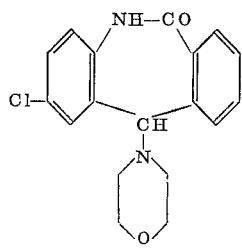

melting at 238–239°.

EXAMPLE 4

The mixture of 8.0 g. 2,11-dichloro-5,6-dihydro-6- morphanthridone and 11.0 g. 2-dimethylamino-ethylamine is heated on the steam cone for 1½ hours. It is evaporated in vacuo, the residue triturated with water, the mixture extracted with diethyl ether, the extract washed with water, dried over potassium carbonate, filtered and evaporated. The residue is recrystallized from diethyl ether to yield the 2-chloro - 11 - (2-dimethylamino-ethylamino)-5,6-dihydro-6-morphanthridone of the formula

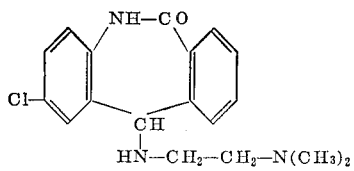

melting at 94–96°.

EXAMPLE 5

To the solution of 2.6 g. 11-amino-2-chloro-5,6-dihydro-6-morphanthridone in the minimal amount of dimethylformamide, 5 g. potassium carbonate and the solution of 1.1 g. 2-dimethyl-amino-ethyl chloride in 50 ml. benzene are added and the mixture stirred for 2 hours at 60–70°. It is then filtered, the filtrate evaporated in vacuo, the residue taken up in diethyl ether, the solution washed with water, dried, filtered and concentrated. The precipitate formed upon cooling is recrystallized from diethyl ether to yield the 2-chloro-11-(2-dimethylamino-ethylamino)-5,6-dihydro-6-morphanthridone melting at 94–96°; it is identical with that obtained according to Example 4.

The starting material is prepared as follows: 10.0 g. 2,11-dichloro-5,6-dihydro - 6 - morphanthridone are dissolved in 500 ml. saturated ethanolic ammonia and the solution allowed to stand for 3 days at room temperature. The precipitate formed is filtered off, washed with water and dried in vacuo to yield the 11-amino-2-chloro-5,6-dihydro-6-morphanthridone melting at 240–242°. By evaporating the mother liquor in vacuo, another crop can be obtained.

EXAMPLE 6

The solution of 2.0 g. 2-chloro-11-(4-methyl-piperazino)-5,6-dihydro-6-morphanthridone in 50 ml. acetanhydride is refluxed for 3 hours and then evaporated. The residue is triturated with ethyl acetate and recrystallized from ethyl acetate-diethyl ether to yield the 5-acetyl-2-chloro-11-(4-methyl-piperazino) - 5,6 - dihydro - 6-morphanthridone of the formula

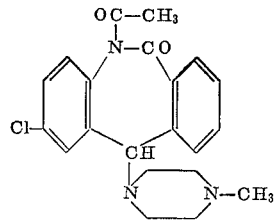

melting at 193–195°.

Analogously the corresponding 2-deschloro-compound is prepared, melting at 223–225° (from diethyl ether).

EXAMPLE 7

The mixture of 5.0 g. 2,11-dichloro-5,6-dihydro-6-morphanthridone and 10.0 g. 2-piperidino-ethylamine is heated on the steam cone until it becomes homogeneous. It is cooled, 40 ml. water are added and the mixture extracted with diethyl ether. The extract is washed with water, dried, filtered and evaporated. The oily residue slowly crystallizes in diethyl ether-petroleum ether and is recrystallized from diethyl ether to yield the 2-chloro-11-(2-piperidino-ethylamino) - 5,6 - dihydro - 6 - morphanthridone of the formula

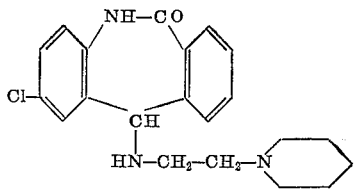

melting at 158–160°.

EXAMPLE 8

The mixture of 3.4 g. 11-chloro-5,6-dihydro-6-morphanthridone and 5 ml. 1-methyl-piperazine is heated at the steam cone for 10 minutes. It is then evaporated, the residue triturated with water and recrystallized from ethanol to yield the 11(4-methyl-piperazine)-5,6-dihydro-6-morphanthridone of the formula

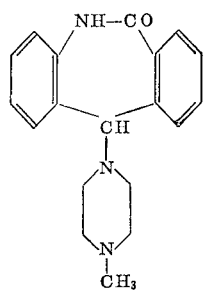

melting at 231–233°.

EXAMPLE 9

The solution of 0.5 g. 6,11-bis-(4-methyl-piperazino)-morphanthridine in 100 ml. 25% aqueous hydrochloric acid is refluxed for 5 hours. It is then made basic in the cold with sodium hydroxide and the mixture extracted with diethyl ether. The extract is washed with water, dried, filtered and evaporated. The residue is recrystallized from ethanol to yield the 11-(4-methyl-piperazine)-5,6-dihydro-6-morphanthridone melting at 231–233°; it is identical with the compound obtained according to Example 8.

The starting material is prepared as follows: The mixture of 5.0 g. 11-hydroxy-5,6-dihydro-6-morphanthridone, 50 ml. phosphorus oxychloride and 5 drops of pyridine is refluxed for 2 hours. It is then evaporated in vacuo to yield the 6,11-dichloro-morphanthridine, which advantageously is used without further purification; after recrystallization from diethyl ether it melts at 166–169°.

The mixture of 5.8 g. thereof (crude material) and 40 ml. 1-methyl-piperazine is heated on the steam cone for 3 hours and allowed to stand overnight at room temperature. It is evaporated at the steam cone, the residue triturated with 200 ml. water, the mixture extracted with diethyl ether, the extract washed with water and then with diluted hydrochloric acid. The acidic aqueous layer is washed with diethyl ether, made basic with sodium hydroxide and extracted with diethyl ether. The extract is washed with water, dried and evaporated to yield the 6,11-bis(4-methyl-piperazino)-morphanthridine, melting after recrystallization from diethyl ether and drying in vacuo at 95–99°.

EXAMPLE 10

To 4 g. 2,11-dichloro-5,6-dihydro-6-morphanthridone, 10 ml. 1-(2-hydroxy-ethyl)-piperazine are added and the mixture is kept at the steam cone for 15 minutes and at room temperature for another 15 minutes. Hereupon 15 ml. ethanol are added, the mixture is refluxed for 15 minutes and allowed to stand at room temperature overnight. It is filtered, the residue washed with ethanol and water, dried and recrystallized from ethanol-diethyl ether to yield the 2-chloro-11-(2-hydroxy-ethyl)-piperazine-3,6-dihydro-6-morphanthridone of the formula

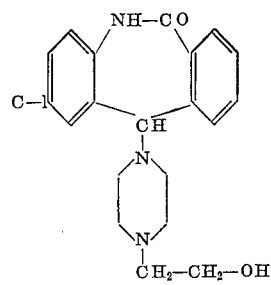

melting at 241–243° with decomposition.

EXAMPLE 11

To 12.5 g. 11-chloro-5,6-dihydro-6-morphanthridone, 25 ml. morpholine are added portionwise and the mixture is heated at the steam cone for 15 minutes. Hereupon 20 ml. ethanol are added and the mixture is refluxed for 15 minutes whereby a solution is obtained. It is concentrated, 100 ml. water are added, and the precipitate formed filtered off. The residue is washed with water until the washings are neutral, dried and recrystallized from ethanol to yield the 11-morpholino-5,6-dihydro-6-morphanthridone of the formula

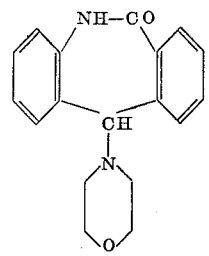

melting at 206.5–208.5°.

EXAMPLE 12

To 1.0 g. 2,11-dichloro-5,6-dihydro-6-morphanthridone, 2 ml. 2-(4-methyl-piperazino)-ethylamine are added and the mixture is stirred for 10 minutes. After the addition of 5 ml. ethanol the mixture is refluxed for 5 minutes, it is cooled, poured into water, extracted with diethyl ether, the extract washed with water, dried, filtered and evaporated. The residue is recrystallized from ethanol to yield the 2-chloro - 11 - [2-(4-methyl-piperazino)-ethylamino]-5,6-dihydro-6-morphanthridone hydrate of the formula

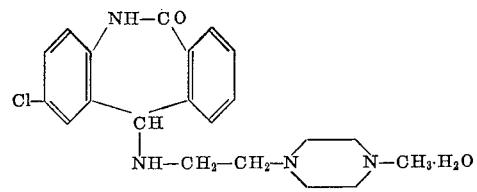

melting at 120–121°.

EXAMPLE 13

To 4 g. 6-chloro-11-morpholino-morphanthridine, the hot solution prepared from 4 g. sodium and 100 ml. methanol is added portionwise and the mixture is allowed to stand for 5 hours at room temperature. It is concentrated to 50 ml., cooled and 50 ml. water are added. The precipitate formed is filtered off and washed with water until the washings are neutral. It is dried and recrystallized from aqueous methanol to yield the 6-methoxy-11-morpholino-morphanthridine of the formula

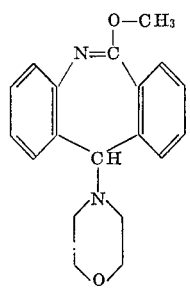

melting at 153–156°.

The starting material is prepared as follows: The mixture of 3 g. 11-morpholino-5,6-dihydro-6-morphanthridone and 40 ml. phosphorus oxychloride is refluxed for ½ an hour and then evaporated. The glassy, foamy residue, consisting of the 6-chloro-11-morpholino-morphantridine, is used as such without further purification.

EXAMPLE 14

According to the method shown in the previous examples the following compounds are prepared from the equivalent amounts of the starting materials listed:

| Starting material | | Final product |
|---|---|---|
| 9-methyl-11-chloro-5,6-dihydro-6-morphanthridone. | 2-benzyl-amino-ethylamine. | 9-methyl-11-(2-benzylamino-ethylamino)-5,6-dihydro-6-morphanthridone. |
| 2-methoxy-11-chloro-5,6-dihydro-6-morphanthridone. | N-(2-methoxy-ethyl)-N-methyl-amine. | 2-methoxy-11-[N-(2-methoxy-ethyl)-N-methylamino,-5,6-dihydro-6-morphanthridone. |
| 4-methylmercapto-11-chloro-5,6-dihydro-6-morphanthridone. | 2-benzyloxy-ethylamine. | 4-methylmercapto-11-(2-benzyloxy-ethylamino)-5,6-dihydro-6-morphanthridone. |
| 9-trifluoromethyl-11-chloro-5,6-dihydro-6-morphanthridone. | 3-ethylmer-capto-propyl-amine. | 9-trifluoromethyl-11-(3-ethyl-mercapto-propylamino)-5,6-dihydro-6-morphanthridone. |
| 8-nitro-2,11-dichloro-5,6-dihydro-6-morphan-thridone. | Thiamor-pholine. | 2-chloro-8-nitro-11-thiamorpholino-5,6-dihydro-6-morphanthridone. |
| 2-dimethylamino-11-chloro-5,6-dihydro-6-morphanthridone. | Tetrahydro-2-furyl-methyl-amine. | 2-dimethylamino-11-(tetra-hydro-2-furylmethylamino-5,6-dihydro-6-morphanthridone. |
| 3,8-dimethyl-11-chloro-5,6-dihydro-6-morphanthridone. | 4-benzyl-piperazine. | 3,8-dimethyl-11-(4-benzyl-piperazino)-5,6-dihydro-6-morphanthridone. |
| 2,11-dichloro-5,6-dihydro-6-morphan-thridone. | 4-ethyl-piperazine. | 2-chloro-11-(4-ethyl-piperazino)-5,6-dihydro-6-morphanthridone. |

EXAMPLE 15

Preparation of 160,000 tablets each containing 0.025 g. of the active ingredient.

Ingredients: G.
- 2 - chloro - 11-(4-methyl-piperazino)-5,6-dihydro-6-morphantridone _____ 4,000.0
- Lactose _____ 28,289.0
- Corn starch _____ 3,410.0
- Confectioners sugar _____ 2,800.0
- Colloidal silica _____ 1,000.0
- Stearic acid powder _____ 400.0
- Calcium stearate _____ 100.0
- Purified water _____ q.s.

Procedure

The active ingredient, the lactose, 2,500.0 g. of the corn starch, the confectioners sugar and the colloidal silica are passed through a screen with 1 mm. openings into a mixer and blended at low speed for twenty minutes. The remainder of the corn starch is suspended in 1 liter cold water, and a paste is formed by gradually adding 4 liters of boiling water. The mixed powders are granulated with the above paste, using additional water as required. The resulting moist mass is passed through a screen with 4 mm. openings, placed on trays and dried at 38° C. until the moisture content is between 2 and 3%. The granules are broken in a comminuting machine, knives forward, passed through a screen with 1 mm. openings and treated with the stearic acid and the calcium stearate, both screened through a screen with 0.8 mm. openings. After mixing for twenty minutes, the granulation is compressed into tablets using standard concave punches, uppers doubly scored.

In the analogous manner compositions are prepared containing as the active ingredient one of the compounds described in Examples 2–13.

EXAMPLE 16

The mixture of 6.0 g. 2,11-dichloro-5,6-dihydro-6-morphanthridone and 12 ml. 1-phenyl-piperazino is heated on the steam cone for 10 minutes, whereupon 10 ml. ethanol are added and heating is continued for 20 minutes. After cooling 10 ml. ethanol are added, the mixture filtered, the residue washed with ethanol and water and recrystallized from methanol, to yield the 2-chloro-11-(4-phenyl-piperazino)-5,6-dihydro-6-morphanthridone of the formula

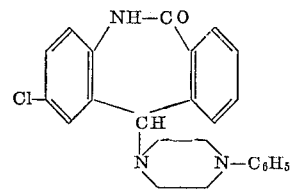

melting at 248–250°.

EXAMPLE 17

To the mixture of 150 ml. concentrated aqueous potassium hydroxide and 850 ml. toluene, 25.0 g. 1-benzyl-piperazino dihydrochloride are added portionwise while shaking. The organic solution is separated, dried and filtered. To the filtrate 9.0 g. 2,11-dichloro-5,6-dihydro-6-morphanthridone are added and the mixture refluxed for 4 hours. After standing at room temperature for 2 days it is filtered, the filtrate washed with water, dried and evaporated. The residue is triturated with diethyl ether and recrystallized from diethyl ether, to yield the 2-chloro-11-(4-benzyl-piperazino)-5,6-dihydro-6-morphanthridone of the formula

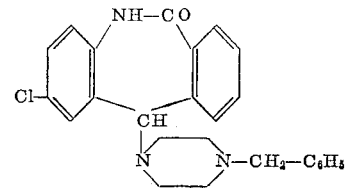

melting at 150–155°.

In the analogous manner, the 11-(4-benzyl-piperazino)-5,6-dihydro-6-morphanthridone is prepared, M.P. 208–209°.

EXAMPLE 18

To the mixture of 5.0 g. 2-chloro-11-(4-benzyl-piperazino)-5,6-dihydro-6-morphanthridone and 200 ml. toluene, 0.55 g. of a 56% suspension of sodium hydride in mineral oil are added at room temperature. After ½ hour 25 ml. methyl iodide are added and the whole refluxed for 4 hours. After cooling, ice and water are added while stirring, the precipitate formed filtered off, washed with water and recrystallized from methanol-acetone, to yield the 2-chloro-5-methyl-11-(4-benzyl-piperazino)-5,6-dihydro-6-morphanthridone methoiodide of the formula

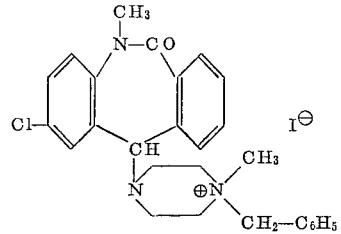

melting at 214–216° with decomposition.

In the analogous manner the corresponding 2-deschloro compound is obtained, M.P. 255–257° (dec.).

EXAMPLE 19

The mixture of 3.7 g. 2-chloro-5-methyl-11-(4-benzyl-piperazino)-5,6-dihydro-6-morphanthridone methoiodide, 250 ml. methanol and 2.0 g. 10% palladium on charcoal is hydrogenated at 48 p.s.i. and about 50° until the hydrogen uptake ceases. The resulting suspension is filtered, the filtrate evaporated, the residue triturated with diethyl ether and recrystalilzed from ethanol, to yield the 2- chloro-5-methyl-11-(4-methyl-piperazino) - 5,6 - dihydro-6-morphanthridone hydroiodide of the formula

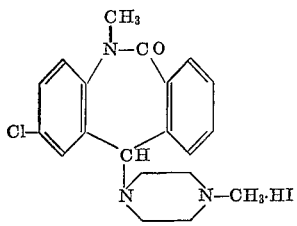

melting at 285–286° with decomposition. The corresponding free base melts, after recrystallization from diethyl ether-petroleum ether, at 178–179°.

In the analogous manner the corresponding 2-deschloro base is prepared, M.P. 156–158°.

EXAMPLE 20

The mixture of 6.0 g. 2,11-dichloro-5,6-dihydro-6-morphanthridone and 13.5 g. 1-ethoxycarbonyl-piperazine is heated on the steam cone for 15 minutes, whereupon 15 ml. ethanol are added. The mixture is heated for another 10 minutes, cooled and filtered. The residue is washed with ethanol and recrystallized from ethanol, to yield the 2-chloro-11-(4-ethoxycarbonyl-piperazino)-5,6-dihydro-6-morphanthridone of the formula

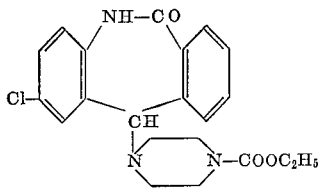

melting at 212–213°.

EXAMPLE 21

To the mixture of 3.8 g. 2-chloro-11-(4-ethoxycarbonyl-piperazino)-5,6-dihydro-6-morphanthridone and 200 ml. toluene, 1.0 g. of a 56% suspension of sodium hydride in mineral oil are added and the whole is stirred and refluxed for ½ hour. Hereupon 50 ml. methyl iodide are added and stirring and refluxing is continued for 5 hours. After cooling water and diethyl ether are added, the organic layer separated, dried, filtered and evaporated. The residue is taken up in ethanol, the solution decolorized with charcoal, filtered and saturated with water. The precipitate formed in the cold is filtered off and recrystallized from diethyl ether to yield the 2-chloro-5-methyl-11-(4-ethoxycarbonyl - piperazino)-5,6-dihydro-6-morphanthridone of the formula

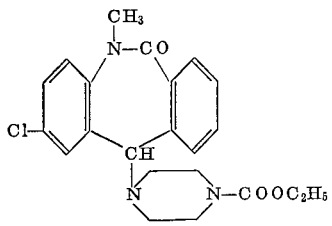

melting at 164–167°.

EXAMPLE 22

The mixture of 5.0 g. 2-chloro-11-(4-ethoxycarbonyl-piperazino)-5,6-dihydro-6-morphanthridone and 200 ml. acetic acid anhydride is refluxed for 3 hours and then evaporated. The residue is recrystallized from ethanol to yield the 2-chloro-5-acetyl-11-(4-ethoxycarbonyl-piperazino)-5,6-dihydro-6-morphanthridone of the formula

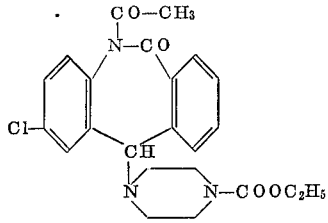

melting at 196–198°.

EXAMPLE 23

The mixture of 4.5 g. 11-chloro-5,6-dihydro-6-morphanthridone and 9.0 g. 1-(2-hydroxyethyl)-piperazine is heated on the steam cone for 15 minutes. Hereupon 15 ml. ethanol are added and the whole is heated for 25 minutes longer. After cooling water and diethyl ether are added, the organic layer separated, washed with water, dried, filtered and evaporated. The residue is recrystallized from ethanol-diethyl ether to yield the 11-[4-(2-hydroxyethyl)-piperazino]-5,6-dihydro-6-morphanthridone of the formula

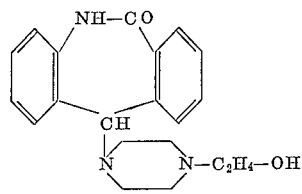

melting at 210–212°.

EXAMPLE 24

To 6.5 g. 6-chloro-11-(4-methyl-piperazino)-morphanthridine the chilled solution, prepared from 5.5 g. sodium and 150 ml. methanol, is slowly added and the mixture allowed to stand for 3 hours at room temperature. It is concentrated in vacuo to 55 ml. and the concentrate diluted with water. The resulting mixture is extracted with diethyl ether, the extract washed with water, dried, filtered and evaporated. The residue is recrystallized from diethyl ether-petroleum ether and again from methanol, to yield the 6-methoxy-11-(4-methyl-piperazino)-morphanthridine of the formula

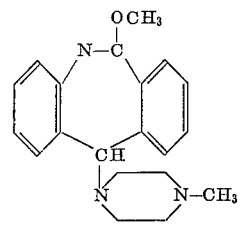

melting at 126–128°.

The starting material is prepared as follows: The mixture of 5.8 g. 11-(4-methyl-piperazino)-5,6-dihydro-6-morphanthridone and 200 ml. phosphorus oxychloride is refluxed for 1 hour and evaporated in vacuo. The residue, consisting of the 6-chloro-11-(4-methyl-piperazino)-morphanthridine, is used as such without purification.

EXAMPLE 25

The mixture of 3.2 g. 5-methyl-11-chloro-5,6-dihydro-6-morphanthridone and 8.5 g. 1-(2-hydroxyethyl)-piperazine is heated on the steam cone for 1 hour while stirring. After cooling it is poured onto ice water, the mixture extracted with diethyl ether, the extract washed with water, dried, filtered and evaporated. The residue is taken up in ethanol-diethyl ether, the solution acidified with ethanolic hydrochloric acid and the precipitate formed filtered off. It is recrystallized from ethanol, to yield the 5 - methyl - 11 - [4 - (2 - hydroxyethyl)-piperazino]-5,6-dihydro-6-morphanthridone hydrochloride of the formula

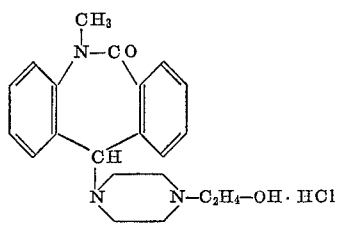

melting at 274–276° with decomposition.

In the analogous manner the 2-chloro-5-methyl-11-[4-(2 - hydroxyethyl) - piperazino] - 5,6-dihydro-6-morphanthridone hydrochloride hemihydrate is prepared, M.P. 284–286° (dec.).

The starting material is prepared as follows: To the mixture of 13.5 g. 5,6-dihydro-morphanthridine-6,11-dione and 600 ml. toluene, 4.0 g. of a 56% suspension of sodium hydride in mineral oil are added while stirring and refluxing for ½ an hour. Hereupon 75 ml. methyl iodide are added portionwise and the whole refluxed and stirred for 6 hours. After cooling, water and diethyl ether are added, the organic layer separated, washed with water, dried, filtered and evaporated. The residue is triturated with diethyl ether and the crystals formed filtered off to yield the 5-methyl-5,6-dihydro-6-morphanthridine-6,11-dione, melting at 92–95°.

To the solution of 7.0 g. thereof in 200 ml. methanol, 25.0 g. sodium borohydride are added portionwise while stirring. The mixture is concentrated on the steam cone, the precipitate formed filtered off, washed with water, dried and recrystallized from methanol, to yield the 5-methyl - 11 - hydroxy - 5,6 - dihydro-6-morphanthridone, melting at 195–197°.

The mixture of 6.9 g. thereof and 200 ml. thionyl chloride is refluxed for 30 minutes and then evaporated. The residue is triturated with diethyl ether and filtered off, to yield the 5-methyl-11-chloro-5,6-dihydro-6-morphanthridone melting at 162–163°.

In the analogous manner the 2,11-dichloro-5-methyl-5,6-dihydro-6-morphanthridone is obtained, M.P. 185–188°.

EXAMPLE 26

The mixture of 5.0 g. 11-[4-(2-hydroxyethyl)-piperazino] - 5,6 - dihydro - 6 - morphanthridone and 200 ml. thionyl chloride is refluxed for 1 hour and then evaporated in vacuo. To the residue diethyl ether is added and the mixture evaporated again in vacuo. To the residue diluted aqueous sodium hydroxide and diethyl ether are added, the organic layer separated, dried, filtered and evaporated. The residue is recrystallized from diethyl ether, to yield the 11-[4-(2-chloroethyl)piperazino]-5,6-dihydro-6-morphanthridone of the formula

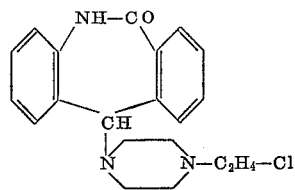

melting at 195–196° with decomposition.

In the analogous manner the 2-chloro-11-[4-(2-chloroethyl) - piperazino] - 5,6 - dihydro-6-morphanthridone is prepared, M.P. 214–215° (dec.).

EXAMPLE 27

To the solution obtained from 0.5 g. sodium and 175 ml. methanol, 2.0 g. 11-[4-(2-chloroethyl)-piperazino]-5,6-dihydro-6-morphanthridone are added and the whole refluxed for 3 hours. After standing for 2 hours at room temperature, the mixture is concentrated in vacuo to 65 ml. and to the concentrate water and diethyl ether are added. The organic layer is separated, washed with water, dried, filtered and evaporated. The residue is recrystallized from diethyl ether to yield the 11-[4-(2-methoxyethyl) - piperazino] - 5,6 - dihydro - 6 - morphanthridone of the formula

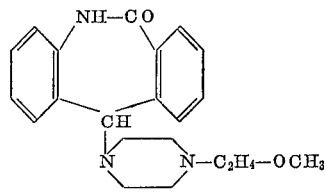

melting at 200–202°.

The analogously prepared corresponding 2-chloro-compound melts at 169–172°.

EXAMPLE 28

The mixture of 2.5 g. 2-chloro-11-[4-(2-chloroethyl)-piperazino]-5,6-dihydro-6-morphanthridone and 15 ml. 1-methylpiperazine is heated on the steam cone for 2 hours and evaporated with the aid of an air stream. To the residue water is added and the precipitate formed filtered off. It is recrystallized from diethyl ether to yield the 2-chloro - 11 - {4-[2-(4-methyl-piperazino)-ethyl]-piperazino}-5,6-dihydro-6-morphanthridone of the formula

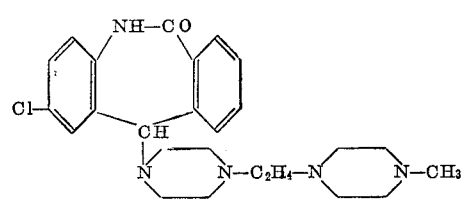

melting at 153–156°.

The analogously prepared 2-deschloro-compound melts at 175–176°.

EXAMPLE 29

The mixture of 4.0 g. 2-chloro-11-[4-(2-chloroethyl)-piperazino] - 5,6 - dihydro - 6 - morphanthridone and 8.0 g. 1-(2-hydroxyethyl)-piperazine is heated for 2 hours on the steam cone. After cooling water is added dropwise, the precipitate formed filtered off, washed with water and recrystallized from methanol-diethyl ether to yield the 2-chloro - 11 - {4 - {2 - [4-(2-hydroxyethyl)-piperazino]-ethyl} - piperazino} - 5,6 - dihydro - 6 - morphanthridone hydrate of the formula

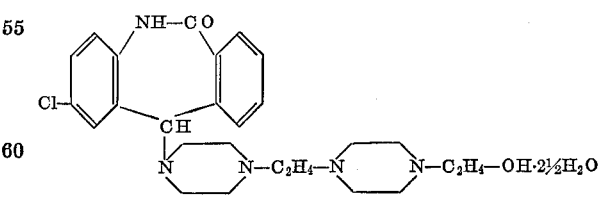

melting at 133–136° with decomposition.

EXAMPLE 30

The mixture of 5.0 g. 2-chloro-11-[4-(2-chloroethyl)-piperazino]-5,6-dihydro-6-morphanthridone and 25 ml. morpholine is heated on the steam cone for 3 hours and allowed to stand at room temperature overnight. It is then evaporated with the aid of an air stream, the residue mixed with water, the mixture filtered and the residue washed with water. It is recrystallized from diethyl ether to yield the 2-chloro-11-[4-(2-morpholinoethyl)-piperazino]-5,6-dihydro-6-morphanthridone of the formula

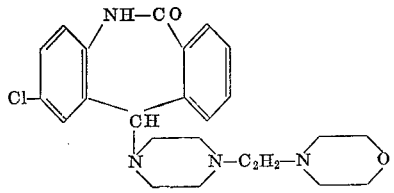

melting at 227–228°.

EXAMPLE 31

The mixture of 1.5 g. of 11-[4-(2-chloromethyl)-piperazino]-5,6-dihydro-6-morphanthridone and the solution prepared from 0.5 g. sodium and 50 ml. of 2-methoxy-ethanol, is refluxed for 2 hours and evaporated in vacuo. To the residue water and diethyl ether are added, the organic layer separated, washed with water, dried, filtered and evaporated. The residue is recrystallized from diethyl ether to yield the 11-{4-[2-(2-methoxy-ethoxy)-ethyl]-piperazino}-5,6-dihydro-6-morphanthridone of the formula

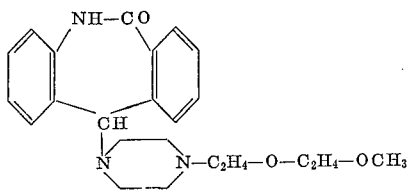

melting at 155–157°.

EXAMPLE 32

Preparation of 10,000 tablets each containing 50.0 mg. of the active ingredients.

| Formula | G. |
|---|---|
| 11-[4-(2 - hydroxyethyl) - piperazino] - 5,6 - dihydro-6-morphanthridone | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water | q.s. |

Procedure

All the powders are passed through a screen with an opening of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. diameter, uppers bisected.

In the analogous manner, shown in this example, as well as in Example 15, pharmaceutical compositions are prepared, comprising as the active ingredient about 25 to 50 mg. of one of the other compounds of the invention described in Examples 1–14, 16–22 and 24–31, especially of those of Example 27, per unit dosage, which latter may be applied up to 3 times a day.

The pentacyclic compounds of the invention, e.g. those shown in Examples 28, 29 and 30, when applied to mice at oral doses between about 10 and 50 mg./kg./day, also show central nervous system depressant effects. Corresponding pharmaceutical compositions, therefore, may also be used, for example, as tranquilizers.

What is claimed is:
1. The 11-amino-5,6-dihydro-6-morphanthridones having the formula

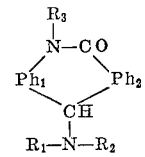

in which each of $Ph_1$ and $Ph_2$ is 1,2-phenylene, (lower alkyl) - 1,2 - phenylene, (lower alkoxy)-1,2 - phenylene, (lower alkylmercapto)-1,2-phenylene, (halogeno) - 1,2-phenylene, (trifluoromethyl)-1,2-phenylene, (nitro)-1,2-phenylene or (di-lower alkylamino)-1,2-phenylene, $R_1$ is hydrogen, lower alkyl, lower alkenyl, halogeno-lower alkyl, lower alkanoyloxy-lower alkyl or lower alkoxy-lower alkyl, $R_2$ is lower alkyamino-lower alkyl, di-lower alkylamino-lower alkyl, phenyl-lower alkylamino-lower alkyl, lower alkyleneimino-lower alkyl, lower alkoxy-lower alkyl, phenyl-lower alkoxy-lower alkyl, lower alkylmercapto-lower alkyl, phenyl-lower alkylmercapto-lower alkyl, tetrahydro-2-furylmethyl or tetrahydro-2-pyranylmethyl or $R_1$ and $R_2$, when taken together, stand for 3-azo-pentylene (1,5), 3-oxa-pentylene (1,5), 3-thia-pentylene (1,5) or N-lower alkyl-, N-(hydroxy-lower alkyl)-, N-(halogeno-lower alkyl)-, N-(lower alkanoyloxy-lower alkyl)-, N-(lower alkoxy-lower alkyl)-, N-(lower alkoxy-lower alkoxy-lower alkyl), N-(piperazino-lower alkyl)-, N-(morpholino-lower alkyl)-, N-(thiamorpholino-lower alkyl)-, N-(N-lower alkyl piperazino-lower alkyl)-, N-(N-hydroxy-lower alkyl piperazino-lower alkyl)-, N-(N-halogeno-lower alkyl piperazino-lower alkyl)-, N-(N-lower alkanoyloxy-lower alkyl piperazino-lower alkyl)-, N-(N-lower alkoxy-lower alkyl piperazino-lower alkyl)-, N-(phenyl-lower alkyl)-, N-lower alkoxycarbonyl- or N-phenyl-3-aza-pentylene (1,5), and $R_3$ is hydrogen or lower alkyl, or their acyl derivatives from a lower alkanoic, lower alkenoic, benzoic, phenyl-lower alkanoic and phenyl-lower alkenoic acid, their lower alkyliminoethers, phenyl-lower alkyliminoethers, lower alkyl quaternaries, phenyl-lower alkyl quaternaries or therapeutically useful acid addition salts thereof.

2. A compound as claimed in claim 1, in which formula each of $Ph_1$ and $Ph_2$ is 1,2-diphenylene, (lower alkyl)-1,2-phenylene, (lower alkoxy) - 1,2 - phenylene or (halogeno)-1,2-phenylene, $R_1$ is hydrogen, lower alkyl or lower alkanoyl, $R_2$ is di-lower alkylamino-lower alkyl, lower alkyleneimino - lower alkyl, lower alkoxy - lower alkyl or lower alkylmercapto-lower alkyl, or $R_1$ and $R_2$, when taken together, stand for 3-aza-pentylene(1,5), 3-oxa-pentylene(1,5), 3-thia-pentylene(1,5), N-lower alkyl-3-aza-pentylene(1,5), N - (hydroxy - lower alkyl)-3-aza-pentylene(1,5) or N-(lower alkanoyloxy-lower alkyl)-3-aza-pentylene(1,5), and $R_3$ is hydrogen, lower alkyl or lower alkanoyl, lower alkyliminoethers, therapeutically useful acid addition salts or lower alkyl quaternaries thereof.

3. A compound as claimed in claim 1, in which formula each of $Ph_1$ and $Ph_2$ is 1,2-phenylene, (lower alkyl)-1,2-phenylene, (lower alkoxy)-1,2-phenylene or (halogeno)-1,2-phenylene, $R_1$ and $R_2$, taken together, are N-(halogeno-lower alkyl)-, (lower alkoxy-lower alkyl)-, N-(lower alkoxy-lower alkoxy-lower alkyl)-, N-lower alkoxycarbonyl-, N-(phenyl-lower alkyl)-, N-phenyl- or N-(N-hydroxy-, halogeno-, lower alkanoyloxy- or lower alkoxy-lower alkyl-piperazino-lower alkyl)- 3-aza-pentylene(1,5), and $R_3$ is hydrogen, lower alkyl or lower alkanoyl, lower alkyl iminoethers, therapeutically useful acid addition salts or lower alkyl quaternaries thereof.

4. A compound as claimed in claim 1 and having the formula

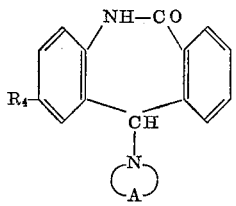

in which A is 3-methyl-3-aza-pentylene(1,5), 3-ethyl-3-aza-pentylene(1,5), 3-(2 - hydroxyethyl)-3-aza-pentylene-(1,5) or 3-(2-methoxyethyl)-3-aza-pentylene(1,5) or 3-oxa-pentylene(1,5) and $R_4$ is chloro, or a therapeutically acceptable acid addition salt thereof.

5. A compound as claimed in claim 4, in which formula A is 3-methyl-3-aza-pentylene(1,5), 3-ethyl-3-aza-pentylene(1,5), 3 - (2 - hydroxyethyl)- or 3-(2-methoxyethyl)-3-aza-pentylene(1,5) or 3-oxa-pentylene(1,5) and $R_4$ is hydrogen or a therapeutically acceptable acid addition salt thereof.

6. A compound as claimed in claim 1, and being the 2-chloro-11-(4-methyl-piperazino)-5,6-dihydro - 6 - morphanthridone or a therapeutically acceptable acid addition salt thereof.

7. A compound as claimed in claim 1, and being the 11 - (4 - methyl - piperazino)-5,6-dihydro-6-morphanthridone or a therapeutically acceptable acid addition salt thereof.

8. A compound as claimed in claim 1, and being the 2 - chloro - 11 - [4-(2-hydroxyethyl)-piperazino]-5,6-dihydro-6-morphanthridone or a therapeutically acceptable acid addition salt thereof.

9. A compound as claimed in claim 1, and being the 11 - [4 - (2 - hydroxyethyl) - piperazino] - 5,6 - dihydro-6-morphanthridone or a therapeutically acceptable acid addition salt thereof.

10. A compound as claimed in claim 1, and being the 2 - chloro - 11 - (4 - methyl - piperazino) - 5,6 - dihydro-6-morphanthridone methoiodide.

11. A compound as claimed in claim 1, and being the 11 - morpholino - 5,6 - dihydro - 6 - morphanthridone, its 2-chloro-derivative, methyliminoether or a therapeutically acceptable acid addition salt thereof.

12. A compound as claimed in claim 1, and being the 2 - chloro - 11 - (4 - phenyl - piperazino) - 5,6 - dihydro-6-morphanthridone or a therapeutically acceptable acid addition salt thereof.

13. A compound as claimed in claim 1, and being the 11 - (4 - benzyl - piperazino) - 5,6 - dihydro - 6 - morphanthridone, its 2-chloro-derivative or a therapeutically acceptable acid addition salt thereof.

14. A compound as claimed in claim 1, and being the 2 - chloro - 5 - methyl - 11 - (4 - benzyl - piperazino)-5,6-dihydro-6-morphanthridone methoiodide.

15. A compound as claimed in claim 1, and being the 5 - methyl - 11 - (4 - methyl - piperazino) - 5,6 - dihydro-6-morphanthridone, its 2-chloro-derivative or a therapeutically acceptable acid addition salt thereof.

16. A compound as claimed in claim 1, and being the 2 - chloro - 11 - (4 - ethoxycarbonyl - piperazino) - 5,6-dihydro-6-morphanthridone, its 5-methyl and 5-acetyl-derivative or a therapeutically acceptable acid addition salt thereof.

17. A compound as claimed in claim 1, and being the 6-methoxy-11-(4-methyl-piperazino)-morphanthridine or a therapeutically acceptable acid addition salt thereof.

18. A compound as claimed in claim 1, and being the 5 - methyl - 11 - [4 - (2 - hydroxyethyl) - piperazino]-5,6-dihydro-6-morphanthridone, its 2-chloro-derivative or a therapeutically acceptable acid addition salt thereof.

19. A compound as claimed in claim 1, and being the 11 - [4 - (2 - chloroethyl) - piperazino] - 5,6 - dihydro-6-morphanthridone, its 2-chloro-derivative or a therapeutically acceptable acid addition salt thereof.

20. A compound as claimed in claim 1, and being the 11 - [4 - (2 - methoxyethyl) - piperazino] - 5,6 - dihydro-6-morphanthridone, its 2-chloro-derivative or a therapeutically acceptable acid addition salt thereof.

21. A compound as claimed in claim 1, and being the 11 - {4 - [2 - (4 - methyl - piperazino) - ethyl] - piperazino}-5,6-dihydro-6-morphanthridone, its 2-chloro-derivative or a therapeutically acceptable acid addition salt thereof.

22. A compound as claimed in claim 1, and being the 2 - chloro - 11 - {4 - {2 - [4 - (2 - hydroxyethyl) - piperazino] - ethyl} - piperazino} - 5,6 - dihydro - 6 - morphanthridone or a therapeutically acceptable acid addition salt thereof.

23. A compound as claimed in claim 1, and being the 2 - chloro - 11 - [4 - (2 - morpholinoethyl) - piperazino]-5,6 - dihydro - 6 - morphanthridone or a therapeutically acceptable acid addition salt thereof.

24. A compound as claimed in claim 1, and being the 11 - {4 - [2 - (2 - methoxyethoxy) - ethyl] - piperazino}-5,6 - dihydro - 6 - morphanthridone or a therapeutically acceptable acid addition salt thereof.

References Cited

UNITED STATES PATENTS

| | | | |
|---|---|---|---|
| 3,242,167 | 3/1966 | Waring | 260—239.3 |
| 3,351,588 | 11/1967 | Davis et al. | 260—239.3 |

FOREIGN PATENTS

| | | | |
|---|---|---|---|
| 889,660 | 10/1958 | Great Britain | 260—239.3 |

HENRY R. JILES, Primary Examiner

R. T. BOND, Assistant Examiner

U.S. Cl. X.R.

424—244

CASE SU-490/1-3

PO-1050
(5/69)

UNITED STATES PATENT OFFICE
CERTIFICATE OF CORRECTION

Patent No. 3,632,572          Dated January 4, 1972

Inventor(s) GORDON NORTHROP WALKER

It is certified that error appears in the above-identified patent and that said Letters Patent are hereby corrected as shown below:

Column 18, line 2, claim 1, "morphanthridones" should read
-- morphanthridone -- .

Column 18, line 36, claim 1, after "N-(N-hydroxy-lower alkyl" insert --- - ---.

Column 18, line 37, claim 1, after "N-(N-halogeno-lower alkyl" insert --- - ---.

Column 18, line 38, claim 1, after "N-(N-lower alkanoyloxy-lower alkyl", insert --- - ---.

Column 18, line 39, claim 1, after "N-(N-lower alkoxy-lower alkyl", insert --- - ---.

Column 18, line 49, claim 2, delete "1,2-diphenylene" and insert --- 1,2-phenylene ---.

Signed and sealed this 27th day of March 1973.

(SEAL)
Attest:

EDWARD M. FLETCHER, JR.
Attesting Officer

ROBERT GOTTSCHALK
Commissioner of Patents